No. 747,771. PATENTED DEC. 22, 1903.
R. RICHTER.
MACHINE FOR HARVESTING POTATOES OR SIMILAR ROOT CROPS.
APPLICATION FILED APR. 16, 1903.
NO MODEL.
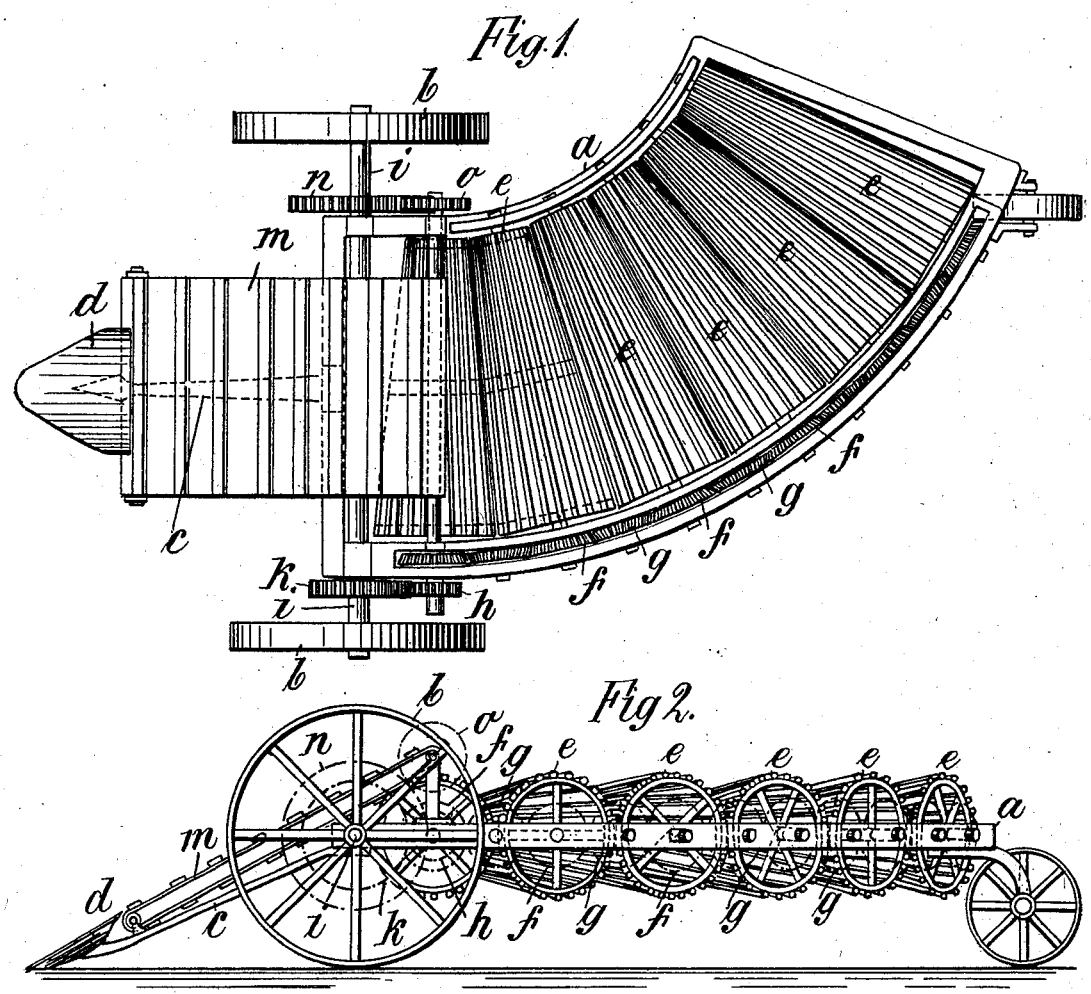
WITNESSES:
F. W. Wright
E. W. Collins
INVENTOR
RUDOLF RICHTER
BY Howson and Howson
HIS ATTORNEYS.

No. 747,771. Patented December 22, 1903.

UNITED STATES PATENT OFFICE.

RUDOLF RICHTER, OF MAHLOW, GERMANY.

MACHINE FOR HARVESTING POTATOES OR SIMILAR ROOT CROPS.

SPECIFICATION forming part of Letters Patent No. 747,771, dated December 22, 1903.

Application filed April 16, 1903. Serial No. 152,969. (No model.)

*To all whom it may concern:*

Be it known that I, RUDOLF RICHTER, landowner, a subject of the German Emperor, residing at Mahlow, Province of Brandenburg, Germany, have invented certain new and useful Improvements in Machines for Harvesting Potatoes or Similar Root Crops, of which the following is a specification.

My invention relates to improvements in that class of potato-harvesting machines in which the tubers and the plants to which they are attached are freed from the earth which is raised therewith by means of a series of conical sieves or drums, with axes lying in or nearly in a horizontal plane, rotating in the same direction, and so arranged radially in an arc of circle that the first is at right angles, or nearly so, to the row being worked and the last parallel, or nearly so, to such row, so that the roots which are unearthed by the plow share or shares in front of the machine and delivered therefrom to the sieves by means of an endless apron or belt or similar device are deposited in a long row or heap at the side of the machine.

The object of the invention is to furnish a potato-harvesting machine which shall in one single operation free the potatoes from the earth which clings to them and deliver them at one side, so that they will not be damaged by the horse or wheels of the machine when the next row is harvested. With this in view the tubers and the plants to which they are attached are thrown by the plowshare upon a series of drum-formed sieves which all rotate in the same direction, but which instead of being cylindrical, as is usually the case, are conical and which are arranged with their flanks touching, so as to form a plane quadrant. Their axes are horizontal and arranged radially from a common imaginary center, that of the first or front drum being at right angles, or nearly so, to the row being worked, while that of the last or rear one is parallel, or nearly so, to such row. I attain this object by the mechanism described in the accompanying drawings, in which similar letters denote similar parts throughout both views, and of which—

Figure 1 shows a plan, and Fig. 2 a side elevation, of the apparatus.

On the front side of the three-wheeled frame *a* is the plowshare *d*, of suitable form. Behind this the conical-shaped drum or sieves *e e e* rest in their bearings and by means of bevel gear-wheels *f* and intermediate idle gears *g* are so connected that they all rotate in the same direction—namely, with their upper surfaces traveling rearward. In consequence of the radial arrangement of these drums in a common practically horizontal plane and with respect to a common imaginary center and of the position of the first and the last ones with relation to the row being unearthed the potatoes are delivered from each sieve to the one behind it around a quadrant, which lies in or nearly in a horizontal plane, and are discharged over the row which is being worked at that side of the machine lying in the direction of the previously-worked row. The first drum or sieve *e* receives its rotation through a spur-wheel *h* upon its shaft, this in turn being driven from a second spur-wheel *k* on the front axle *i* of the running-gear or on one of the front wheels.

To raise the potatoes from the plowshare or shares *d* to the front sieve or drum *e*, there is preferably a continuous-delivery apron *m*, either of stout textile material or of slats and which is driven in any suitable manner—for instance, by means of two gear-wheels *n* and *o*, the first of which is fixed on the axle of the front wheels, while the latter is fixed on the upper roll of the apron. The upper surface of the apron travels, therefore, upward and rearward. Instead of this, however, I may employ a roller-frame such as is used with many brick-machines.

The operation of the machine is as follows: The potatoes which are raised by the plowshare or shares *d* are delivered with the earth, which may cling thereto or be raised therewith, on the apron *m*, which delivers them to the first sieve or drum *e*. In their passage over the sieves or drums *e* the earth and the potatoes are separated from each other, the former falling through the sieves, while the potatoes, with the roots, stems, and leaves, are carried along the upper surfaces of the sieves or drums over the quadrant-shaped course and at last delivered sidewise at right angles, or nearly so, to the furrow. The potatoes are therefore not scattered over a large area, but delivered in a narrow line or row parallel to the course of the machine, so that they may easily be collected.

I claim as my invention—

1. In a harvesting-machine for potatoes and similar root crops, means for freeing the tubers and the plants to which they are attached from the earth, in combination with a series of conical drums having their axes lying in or nearly in a horizontal plane, rotatable in the same direction, the drums being arranged radially in an arc of a circle so that the first is at right angles or nearly so to the row being worked and the last parallel or nearly so to such row, whereby the roots are delivered sidewise and in a long narrow heap.

2. In a harvesting-machine for potatoes and similar root crops, the combination of a series of conical drums, with axes in or nearly in a horizontal plane, rotatable in the same direction, and so arranged radially that the first is at right angles or nearly so to the row being worked, and the last parallel or nearly so to this row with a plowshare delivery-apron which receives the roots from the plowshare.

In testimony whereof I have signed my name to this specification in the presence of two subscribing witnesses.

RUDOLF RICHTER.

Witnesses:
JOHANNES HEIN,
HENRY HASPER.